3,826,772
ADHESIVE FOR BONDING ELASTOMERS TO METALLIC AND NONMETALLIC SUBSTRATES
Manfred Gebhard and Curt Nitzsche, Frankfurt am Main, and Simon Pfeffer, Messel, Germany, assignors to Metallgesellschaft Aktiengesellschaft, Frankfurt am Main, Germany
No Drawing. Filed Aug. 10, 1971, Ser. No. 170,626
Claims priority, application Germany, Aug. 22, 1970, P 20 41 769.0
Int. Cl. C08f 45/28, 45/30, 45/36
U.S. Cl. 260—31.2 MR                    5 Claims

ABSTRACT OF THE DISCLOSURE

A solvent-thinned adhesive for the bonding of rubber to metallic or nonmetallic substrates consisting essentially of halogenated elastomers or synthetic resins, a dioxime compound, an inorganic hexavalent chromium compound and an inorganic acid.

1. Field of the Invention

Our present invention relates to adhesives and, more particularly, to a moisture-resistant long-wearing adhesive for bonding elastomers to metallic or nonmetallic substrates.

2. Background of the Invention

Numerous adhesive compositions have been proposed heretofore for bonding flexible or inflexible materials to metals and other substrates, for bonding various articles to wood and for bonding elements to ceramic or ceramic to other substrates. Of particular interest to the present invention are adhesives of some degree of flexibility and resiliency in "set" condition. It is known, for example, to provide so-called hardening adhesives which penetrate into or chemically or physically bond to the elements to be joined together but, when set, are stiff, brittle and inflexible. It is also known to provide elastomer-containing adhesives or cements which originally may be tacky, but which set to a nontacky but high-bonding condition.

As noted, the present invention is directed to adhesives or cements of the latter type, i.e. to cements which retain a certain degree of elasticity and resiliency. The requirements for such cements are, of course, well known. They include, for example, a certain elasticity or flexibility, as already noted, high resistance to weathering including moisture resistance and resistance to oxidation, high adhesive strength or bonding strength without pretreatment of the surface to which the adhesive is applied or with minimum pretreatment, and a long "pot life." The latter is a measure of the useful life of the composition prior to setting. An adhesive with a short pot life must be used immediately following preparation because it tends to harden rapidly and becomes unusable after such hardening or drying. A material with high pot life may be stored for considerable time after preparation without interference with bonding quality or may be rendered effective by the addition of solvent.

It is known to make cements or adhesives of an elastic quality from a mixture of chlorinated rubber, vulcanizable halogen-containing polymers of butadiene, substituted butadienes, isobutylene or cyclopentadiene or mono or dinitroso compounds in a solvent system. Such materials compounded together, form an elastic adhesive upon evaporation of the solvent. Strongly adherent elastic adhesives have also been made from halogenated film-forming substances combined with nitroso substituted condensation polymers. These may contain novolac, organic nitrides, inorganic nitrides, and aqueous or organic solvent systems or vehicles. Chlorinated elastomers have also been compounded with copolymers of a diene with acrylic acid esters or methacrylic acid esters (acrylates or methacrylates), a dioxime, an oxidizing medium for the dioxime and the solvent.

All of the aforedescribed systems have a high bonding strength or adhesivity and are generally resistant to external influences, especially moisture and atmospheric oxidation. They have, however, been found to be practical only for the bonding of metal to natural or synthetic elastomers. They are unsatisfactory or less satisfactory for the bonding of synthetic resins to one another, for the bonding of synthetic resins to wood, other natural substances, metals, ceramics or the like. They cannot be used effectively for the bonding of thermoplastic materials, for example, to thermosetting materials. Attempts to use these substances for the bonding of synthetic resins to wood, synthetic resins to ceramics and synthetic resins to glass have also been less satisfactory than is desired.

While there have been other adhesives suggested which will bond the latter materials together more effectively, these substances are characterized by other disadvantages. Either the pot life is short so that the composition must be used within a few days of production or it is difficult to apply the compositions to the substrates or workpieces, i.e. the working of the composition is poor. For example, in some cases it is necessary to apply a primer to the metal if an effective bond between the adhesive and the metal is to result. In other cases, the adhesive has been insufficiently resistant to moisture, can be attacked by hot water so that the bond may be broken or weakened, or may be insufficiently resistant to other environmental conditions. This is an important disadvantage since adhesives for bonding rubber to metals, for example, are used in motor suspensions, bearings, shaft suspensions, vibration-damping, sound-damping, clutch, supports, seals and the like. They are used for the seals, washers and packings of water lines, as washing machine suspensions and the like. In many of these applications the adhesives are exposed to corrosive and moisture-laden environments and a sensitivity to heat, moisture and corrosive environments is a major disadvantage.

3. Objects of the Invention

It is, therefore, the principal object of the present invention to provide an improved adhesive, especially for bonding of rubber or other elastomeric materials to metallic and non-metallic substrates.

Another object of the invention is the provision of an adhesive composition which will have a long pot life and can be stored for long periods, which is easily applied to the surfaces to be bonded together, which does not need extensive priming or other preparation of the surfaces to be joined, which affords at least a limited measure of elasticity and resiliency, which is waterproof and insensitive to moisture, and which maintains a high bonding strength under conditions usually considered adverse for prior-art adhesives.

It is still another object of the invention to provide an adhesive composition which represents an advance over the adhesive compositions existing heretofore and which overcomes the aforementioned disadvantages.

4. Description of the Invention

We have discovered that these objects can be attained with a composition which basically comprises a halogenated-polymer component, an organic oxime component, a hexavalent chromium component, an inorganic acid component and a solvent component blended into a homogeneous mass. Surprisingly, this composition is free from the disadvantages of earlier adhesives containing chlorinated elastomers or oxime-type compounds and is useful substantially universally in the sense that it provides a satisfactory bond not only between rubber and metal but between natural and synthetic rubbers and elastomers generally and nonmetallic substrates or unprimer metals. The adhesive can be stored for long periods and can be worked easily.

The halogenated polymer component, according to the present invention, consists of one or more chlorinated and/or brominated synthetic or natural rubbers or elastomers and/or chlorinated and/or brominated polyolefins. In other words, the halogenated elastomer component should consist of at least one compound selected from the group which consists of chlorine-containing and/or bromine-containing natural rubber; chlorine-containing and/or bromine-containing synthetic rubbers, especially homopolymers, copolymers and mixed polymers of butadiene, isoprene, chloroprene, styrene, acrylonitrile, acrylic acid and methacrylic acid and acrylic or methacrylic ester monomers; and chlorine-containing and/or bromine-containing polyolefins such as polyethylene, polypropylene, polyvinylchloride, polyvinylidenechloride, and stereospecific polymers. The polymers can be halogenated during production but preferably are after-chlorinated or postchlorinated and/or postbrominated in suspension, emulsion or solution. The after-halogenation or post-halogenation merely requires bubbling of the halogen gas through the liquid phase in which the elastomer is dispersed.

According to another feature of the invention, the halogenated elastomer contains fillers and/or extenders which may be inorganic, metallic, naturally occurring and/or organic substances. Among the inorganic substances which can be used as fillers and extenders are carbon black and metal oxides such as titanium dioxide, zinc oxide, silizium dioxide and aluminum oxide, together, individually or in any combination. Preferably the composition contains some carbon black. Metallic fillers and extenders includes the powdered metals such as zinc powder. Organic fillers or extenders are preferably the nonelastomeric synthetic resins, especially thermosetting synthetic resins such as thermosetting phenolics (phenol-formaldehyde), melamine-formaldehyde resins, melamine-urea resins, unsaturated polyesters, epoxy resins, polyisocyanates and/or pyromellitic acid-polyamine precondensates. The filler or extender component may, of course, consist of a mixture of inorganic and metallic compounds, inorganic and organic compounds, metallic and organic compounds, or all three as desired.

The oxime component, according to the present invention, should consist of one or more compounds, each of which has two or more oxime groups and we prefer to use quinoneoximes, especially the paraquinoneoxime, i.e. the p-quinonedioxime.

The hexavalent chromium component can be selected from the group which consists of chromate salts and mixtures thereof, of which we prefer to use the lead chromate ($PbCrO_4$), the zinc chromate ($ZnCrO_4$), barium chromate ($BaCrO_4$), potassium dichromate ($K_2Cr_2O_7$) or sodium dichromate ($Na_2Cr_2O_7$), or mixtures thereof, as anhydrous crystals or as crystals containing water of hydration.

The inorganic acid component, according to the present invention, may be one of the strong inorganic acids such as hydrochloric acid, sulfuric acid, hydrofluoric acid, fluoroboric acid, but preferably is or contains phosphoric acid. These acids may be used alone or in combination to constitute the inorganic acid component.

The solvent component, according to the present invention, may be a single solvent or a solvent mixture capable of solubilizing the organic constituents of the mixture and may be aromatic or aliphatic. Among the aromatic hydrocarbons which have been found to be suitable are benzene, toluene and xylene while the desirable aliphatic hydrocarbons include such catenary and cyclic hydrocarbons as hexane, heptane, cyclohexane, chloroform and carbon tetrachloride. Other hydrocarbon solvents which may be used are trichloroethylene and perchloroethylene. Somewhat more polar organic compounds such as methyl acetate, ethyl acetate, butyl acetate and similar esters, and ketones such as acetone, methylethylketone and methyl-isobutylketone have been used with success.

Preferably the composition consists of 15 to 95 parts by weight of the halogenated-polymer component, preferably 30 to 90 parts by weight thereof, per 100 parts by weight of the dry adhesive (i.e. the adhesive subsequent to setting and evaporation of the solvent). The oxime component may be present in an amount between 0.4 and 40 parts by weight, preferably 2.0 to 28.0 parts by weight, while the chromium component is used in an amount of 0.2 to 20 parts by weight, preferably 0.32 to 12 parts by weight. 0.01 to 5.0 parts by weight, preferably 0.08 to 3.0 parts by weight of the inorganic acid component is employed while the solvent proportion depends upon the desired viscosity of the adhesive and thus upon its application. For coating by brush or blade, for example, 50 to 98 parts by weight of the solvent component is employed. All of the amounts given above are based upon 100 parts by weight of the dry adhesive.

5. Specific Examples

EXAMPLE I

An adhesive is compounded with the following composition:

Parts by weight—

| | |
|---|---:|
| Of a 20% solution of after-brominated poly-2,3-dichlorobutadiene in xylene (bromine content 12–18% by weight of the poly-2,3-butadiene) | 30.0 |
| Chlorinated natural rubber caoutchouc) with a chlorine content of 67% by weight | 17.0 |
| Of a 20% dispersion of easy processing carbon black in xylene | 7.0 |
| Paraquinonedioxime | 0.8 |
| Potassium dichromate | 0.2 |
| Of an 85% solution of ortho-phosphoric acid | 0.1 |
| Xylene | 26.0 |
| Perchloroethylene | 44.5 |

Similar metal disks with a diameter of 35.7 mm. are decreased with trichloroethylene and are sandblasted with chill-cast shot. A thin layer of the adhesive blended homogeneously from the above composition is applied in a thin layer to each of the disks and permitted to dry. Between two such disks a layer having a thickness of 10 mm. of a natural rubber master batch with a hardness of 45° Shore A is bonded and the entire assembly vulcanized for a period of 30 minutes and at a temperature of 143° C. under pressure. The master batch had the following composition:

| | Parts by weight |
|---|---:|
| Smoked sheet natural rubber | 100 |
| Stearic acid | 1.0 |
| Zinc oxide | 10.0 |
| Sulfur | 3.25 |
| Phenyl-β-naphthylamine | 1.0 |
| Active carbon black | 30.0 |
| Aromatic mineral oil plasticizer | 32.5 |
| 2,2-dibenzylthiazyldisulfide | 1.5 |
| Diphenylguanidine | 0.22 |

The indicated vulcanizing temperature and period was found to be the optimum. After a 24-hour period of stand, the bonding strength of the adhesive was tested. Table I gives the results obtained for the bonding of the adhesive with metals including iron, VA-steel, brass, aluminum, iron which is not sandblasted and aluminum which is not sandblasted. The first column of the Table names the substrate, the second column gives the adhesion, the third column the standard mean error or deviation and the fourth column the retention percentage in terms of area of the rubber remaining upon the metal upon breakage of the bond. The values are averaged for four specimens of each metal.

TABLE I

| Metal | Adhesivity, kp./cm.² | Standard deviation, percent | Retention, percent R |
|---|---|---|---|
| Iron | 98 | 1 | 90 |
| VA-Steel | 75 | 1 | 10 |
| Brass | 79 | 1 | 50 |
| Aluminum | 85 | 0.5 | 20 |
| Iron (nonblasted) | 90 | 0.5 | 90 |
| Aluminum (nonblasted) | 86 | 0 | 90 |

Using the sandblasted-iron/rubber specimens, the following tests were carried out:

(a) Weathering Test

A weathering test according to DIN (German Industrial Standard) 50017 for a period of eight weeks in a chamber held at 100% relative humidity and 40° C. over this period. No reduction in the adhesion is found.

(b) Hot-Water Test

From the materials of the present Example, peel strips are made in accordance with ASTM standard D-429 method B, and are tested in 95° C. water. The stripping force was 2 kp. over a 2.5 cm. width of the strip, the stripping angle was 90° C. Each sample withstood this test for a period of ten hours without any indication of difficulty.

(c) Repeated Flexing Test

The same specimen was subjected to a repeated-flexing test in a dynamic system (see ASTM standard D-797) and withstood 2.5 million revolutions at a loading of 2.6 kp./cm.² without reduction in adhesion.

(d) Sensitivity to Vulcanization Parameters

When the specimen is subjected to vulcanization under the indicated conditions but the period shortened by 20%, adhesion is 96 kp./cm.² with 3% mean error and retention of 20% R. When the vulcanization duration is exceeded by 30%, the corresponding values are adhesive strength 96 kp./cm.², 7% mean error and 10% R.

EXAMPLE II

An adhesive is compounded with the following compositions:

Parts by weight—
| | |
|---|---|
| After-chlorinated polyvinyl chloride (70% by weight chlorine) | 14.0 |
| Bromine-containing poly-2,3-dichloro butadiene with a chlorine content of 42% (12–18% by weight bromine) | 3.0 |
| Of a 20% dispersion of easy processing carbon black in xylene | 7.0 |
| Zinc powder | 1.0 |
| Paraquinonedioxime | 10.0 |
| Sodium dichromate | 4.0 |
| 96% sulfuric acid | 1.0 |
| Xylene | 100.0 |
| Perchloroethylene | 44.0 |

Round metal disks with a diameter of 35.7 mm. are treated with a thin layer of adhesive as described in Example I. Between two such disks a layer of 10 mm. thickness of a natural rubber master batch with a hardness of 65° Shore A is bonded and the entire assembly vulcanized for a period of 30 minutes and at a temperature of 143° C., as in Example I (vulcanization optimum). The master batch had the following composition:

| | Parts by weight |
|---|---|
| Smoked sheet natural rubber | 100.0 |
| Stearic acid | 1.0 |
| Zinc oxide | 10.0 |
| Sulfur | 2.5 |
| Phenyl-β-naphthylamine | 1.0 |
| Active channel black | 46.0 |
| Pine tar | 0.2 |
| Aromatic mineral oil plasticizer | 2.0 |
| 2,2-dibenzylthiazyldisulfide | 1.16 |
| Diphenylguanidine | 0.17 |

After a 24-hour period of stand, the bonding strength of the adhesive was tested. Table II gives the results obtained for the bonding of the adhesive with metals including iron, VA-steel, brass, aluminum, iron which is not sandblasted and aluminum which is not sandblasted. The first column of the Table names the substrate, the second column gives the adhesion, the third column the standard mean error and the fourth column the percentage in terms of area of the rubber remaining upon the metal upon breakage of the bond. The values are given for four specimens of each metal.

TABLE II

| Metal | Adhesive strength, kp./cm.² | Standard deviation, percent | Retention, percent R |
|---|---|---|---|
| Iron | 108 | 3 | 100 |
| VA-Steel | 116 | 0.5 | 70 |
| Brass | 115 | 0 | 70 |
| Aluminum | 109 | 0 | 90 |
| Iron (nonblasted) | 114 | 0.2 | 60 |
| Aluminum (nonblasted) | 91 | 1.5 | 90 |

Using the sandblasted iron-rubber specimens, the following tests were carried out:

(a) Weathering Test

Storage of the sandblasted round iron parts in a tropical climate over a period of eight weeks did not show a reduction in the adhesion.

(b) Hot-Water Test

The hot-water test as described in Example 1, after 10 hours did not show a reduction in the rubber-metal bonding.

(c) Repeated Flexing Test

After a dynamic test as described in Example 1, 3 million revolutions at a loading of 2.6 kp./cm.² did not destroy the bond.

(d) Sensitivity to Vulcanization Parameters

When the optimum vulcanization time was reduced by 50%, the adhesive strength was 108 kp./cm.² with 1% average deviation and a retentivity of 10% R. When the vulcanization duration is increased by 50% above optimum, adhesivity is 109 kp./cm.², average deviation is 3% and R is 100%. When the vulcanization duration is increased by 100%, adhesivity is 108 kp./cm.², average deviation is 5% and R is 90%. All tests were made using sandblasted iron as the metal.

EXAMPLE III

An adhesive is compounded with the following compositions:

Parts by weight—
| | |
|---|---|
| Of a 20% solution of brominated poly-2,3-dichlorobutadiene in xylene (12-18% bromine by weight) | 50.0 |
| Chlorinated polypropylene (55% chlorine by weight) | 40.0 |
| Paraquinonedioxime | 20.0 |
| Zinc chromate | 10.0 |
| 32% HCl solution | 4.0 |
| Xylene | 200.0 |
| Perchloroethylene | 120.0 |

Round, 3 mm. thick disks of nylon-6 polyamide with a diameter of 35.7 mm are degreased by an organic solution removed of fat and a thin layer of adhesive applied. Between two such polyamide disks having a thickness of 10 mm. of a natural rubber master batch with a hardness of 45° Shore A is bonded and the entire assembly vulcanized for a period of 20 minutes and at a temperature of 160° C. The master batch had the following composition:

| | Parts by weight |
|---|---|
| Smoked sheet natural rubber | 100.0 |
| Stearic acid | 1.0 |
| Zinc Oxide | 25.0 |
| Phenyl-$\beta$-naphthylamine | 1.0 |
| Antiageing composition 4010 NA of Bayer, Leverkusen | 1.0 |
| Sulfur | 2.5 |
| Diphenylguanidine | 2.0 |
| 2-mercaptobenzothiazoline | 5.0 |
| Aromatic mineral oil plasticizer | 50.0 |
| Pyrolytic carbon black (MT carbon black) | 25.0 |

The indicated vulcanizing temperature and period was found to be the optimum.

The adhesive strength was 76 kp./cm.$^2$, the standard deviation was 1% and the retentivity was 100% R.

With the specimens the following tests were carried out:

(a) Weathering Test

The test was carried out according to Example I, and resulting measurement of the adhesive forces showed no drop in adhesive value.

(b) Hot-Water Test

The test was carried out according to Example I, and no reduction in the quality of the bond was found after ten hours of the test.

(c) Sensitivity to Vulcanization Parameters

When the vulcanization time was reduced 20% from the optimum value given earlier, the adhesivity was 74 kp./cm.$^2$ with 2% standard deviation and retentivity of 80% R. The corresponding values for a 20% increase in the vulcanization time were: adhesive bonding strength=73 kp./cm$^2$ at 2% standard deviation, and R=85%.

EXAMPLE IV

The adhesive composition was blended from:

| | Parts by weight |
|---|---|
| 20% xylene solution of brominated poly-2,3-dichlorobutadiene (bromine content 12–18% by weight) | 65.0 |
| Chlorinated caoutchouc | 13.0 |
| Thermosetting phenol-formaldehyde resin (Phenodur PR 141) | 10.0 |
| 20% carbon black dispersion in xylene | 7.0 |
| p - Quinonedioxime | 0.7 |
| Barium chromate | 0.15 |
| Hexafluorosilicic acid | 0.2 |
| Xylene | 125.0 |
| Perchloroethylene | 50.0 |

Round disks of oakwood with a diameter of 35.7 mm. are degreased and roughened slightly with emery paper. The adhesive of the composition given above is applied to one side of each disk by a brush. A rubber sheet (Shore A=45°) having a thickness of 10 mm. is sandwiched between the adhesive-coated disks and the assembly is heated under pressure for 30 minutes at 143° C. to form a vulcanized bond. The rubber layer has the following composition:

| | Parts by weight |
|---|---|
| Smoked natural rubber sheet | 100.0 |
| Stearic acid | 1.0 |
| Zinc oxide | 10.0 |
| Sulfur | 3.25 |
| Phenyl - $\beta$ - naphthylamine | 1.6 |
| Active carbon black | 28.0 |
| Mineral oil plasticizer | 34.5 |
| 2,2 - dibenzylthiazyldisulfide | 1.55 |
| Diphenylguanidine | 0.22 |

After storage for 24 hours at room temperature, the samples were tested for adhesive strength. The adhesive strength was 88 kp./cm.$^2$, the average deviation was 2% and the retentivity of rubber R=80%. When the above-given vulcanization time was exceeded by 20%, the adhesive-bond strength was 84 kp./cm.$^2$ at 5% average deviation and R=60%. When the vulcanization time was reduced by 20% from the optimum, the adhesive-bond strength was 85 kp./cm.$^2$ at 4% average deviation and R=65%.

EXAMPLE V

The adhesive used in Example I is employed to bond a synthetic rubber layer to sandblasted iron disks. The rubber layer has a Shore hardness A=68°. The layer has the following composition:

| | Parts by weight |
|---|---|
| Butadiene-acrylonitrile with an average acrylonitrile content | 100.0 |
| Stearic acid | 1.0 |
| Zinc oxide | 5.0 |
| Sulfur | 2.0 |
| HAF carbon black | 43.0 |
| N-cyclohexyl-2-benzothiazol-sulfenamide | 1.8 |

The system is vulcanized at the optimum level of 143° C. for 30 minutes and the test specimens had an adhesive-bond strength of 94 kp./cm.$^2$ and a retentivity on break of 90% R.

EXAMPLE VI

An adhesive of Example I is used to bond an oil-extended SBR rubber layer with a Shore hardness of 55° A and a thickness of 10 mm. to sandblasted iron disks. The rubber layer has the following composition:

Parts by weight—

| | |
|---|---|
| Buna SBR rubber 302 | 137.5 |
| Stearic acid | 2.75 |
| Zinc oxide | 7.0 |
| Sulfur | 2.4 |
| Each of anti-ageing compounds PBN and 4010 NA of Bayer, Leverkusen, Germany | 1.0 |
| Of aromatic mineral oil plasticizer | 3.0 |
| HAF carbon black | 70.0 |
| Of N - cyclohexyl - 2 - benzothiazol-sulfenamide | 1.72 |

The vulcanization was carried out at the optimum temperature of 143° C. for the optimal period of 30 minutes, using sandblasted iron disks coated with the adhesive of Example I. The adhesive-bond strength was 77 kp./cm.$^2$ and R=60%.

EXAMPLE VII

A 10 mm. thick rubber layer of Shore A-hardness 55° is bonded between sandblasted iron disks coated with the adhesive of Example I and vulcanized for 30 minutes at 153° C., these values constituting the optimum. The rubber layer had the following composition:

Parts by weight—
- Neoprene WHV _____ 100.0
- Zinc oxide _____ 5.0
- Magnesium oxide _____ 4.0
- Of anti-ageing compound PAN of Bayer, Leverkusen, Germany _____ 2.0
- Of Mercaptoimidazoline _____ 3.5
- Stearic acid _____ 0.5
- HAF carbon black _____ 30.0
- Aromatic mineral oil plasticizer _____ 1.0

The adhesive-bond strength was 97 kp./cm.$^2$., R=60%

EXAMPLE VIII

The adhesive of Example I was used as a bonding agent to a cut mixture of Buna CB 11 rubber and natural rubber of the following composition:

Parts by weight—
- Buna CB 11 styrene butadiene rubber _____ 60.0
- Natural rubber _____ 40.0
- Koresin _____ 2.0
- Of the anti-ageing compound 4010 NA (Bayer, Leverkusen, Germany) _____ 1.5
- Anti-ageing compound MB (Bayer, Leverkusen, Germany) _____ 1.5
- Benzothiazol-2-sulfenmorpholide _____ 1.6
- Zinc oxide _____ 15.0
- Tetramethylthiuramdisulfide _____ 0.3
- Sulfur _____ 0.5
- HAF carbon black _____ 40.0
- Stearic acid _____ 2.0
- Aromatic mineral oil plasticizer _____ 7.5

The adhesive was applied to sandblasted iron disks sandwiched on opposite sides of a 10 mm.-thick disk of the rubber which had a hardness of 60° Shore A.

The system was vulcanized at the optimum of 151° C. for 25 minutes and had a bonding strength of 85 kp./cm.$^2$ at 70% R.

EXAMPLE IX

The adhesive of Example I was used with a butyl rubber of the following composition:

Parts by weight—
- Polysar butyl 301 of Polymer Corp., Sarnia, Canada _____ 100.0
- Zinc oxide _____ 25.0
- SRF carbon black _____ 25.0
- ISAF carbon black _____ 25.0
- Paraffinic mineral oil plasticizer _____ 5.0
- Paraquinonedioxime _____ 2.0
- Di-2-benzothiazyldisulfide _____ 4.0
- Sulfur _____ 1.0

The rubber layer had a thickness of 10 mm. and a hardness of 55° Shore A. At the optimum vulcanization time of 50 minutes at 153° C., using iron test specimens to which the adhesive is applied and the rubber layer bonded, an adhesive strength of 50 kp./cm.$^2$ at 100% R was obtained.

EXAMPLE X

The adhesive of Example I is used with a rubber layer of an EPDM type in the following composition:

Parts by weight—
- Keltan 70 of DSM, Geleen, Holland _____ 100.0
- Zinc oxide _____ 5.0
- Stearic acid _____ 1.0
- Naphthenic plasticizer _____ 25.0
- HAF carbon black _____ 50.0
- Tetramethylthiazyldisulfide _____ 1.0
- 2-Mercapto benzothiazole _____ 2.5
- Sulfur _____ 1.5

The adhesive is coated onto sandblasted iron disks and the rubber layer of 10 mm.-thickness and Shore A hardness of 50° is sandwiched between them. Vulcanization is effected at the optimum of 30 minutes and 160° C. The bond strength was 60 kp./cm.$^2$ and the retentivity was R=90%.

The adhesive according to the present invention does not only have a high bond strength but also is effective for bonding nonmetallic as well as metallic material to rubbers of various kinds. It has proved to be effective with wood or synthetic resins and with synthetic or natural rubbers. It is not sensitive to deviation from the vulcanization optimum and wide deviations therefrom may be used without interfering with the high bond strength. The compositions may be stored for long periods without becoming useless or ageing and experiments have shown that the composition can be stored at 15–16° C. for periods of up to 12 months without any increase in voscosity. The adhesive can be applied by doctoring, dipping, spraying, airless spraying, rolling or electrostatic deposition. Primers are unnecessary and workpiece thicknesses from several millimeters to several centimeters can be used without difficulty. The adhesive is resistant to water and to corrosive environments and remains highly elastic for long periods.

We claim:

1. An adhesive for bonding an elastomer to a substrate upon vulcanization of the elastomer-adhesive-substrate assembly, said adhesive consisting essentially of a halogenated elastomer component selected from the group which consists of chlorinated, brominated and chlorinated and brominated natural and synthetic rubbers and polymeric olefins, an organic dioxime component, an organic solvent, an inorganic hexavalent-chromium component in the form of a chromate and an inorganic acid component selected from the group which consists of phosphoric acid, hydrochloric acid, sulfuric acid, hydrofluoric acid, borofluoric acid and fluorosilicic acid, said halogenated elastomer component being present in an amount of 15 to 95 parts by weight, said oxime component being present in an amount between 0.4 and 40.0 parts by weight, said hexavalent chromium components being present in an amount between 0.2 to 20 parts by weight and said inorganic acid being present in an amount between 0.01 and 5.0 parts by weight per 100 parts by weight of the dry adhesive, said elastomer, dioxime, acid and hexavalent chromium components being distributed in said solvent.

2. The adhesive defined in claim 1 wherein said oxime is paraquinonedioxime.

3. The adhesive defined in claim 1 wherein said hexavalent chromium component includes at least one compound selected from the group which consists of lead chromate, zinc chromate, barium chromate, potassium dichromate and sodium dichromate.

4. The adhesive defined in claim 3 wherein said solvent is selected from the group which consists of benzene, toluene, xylene, hexane, heptane, cyclohexane, chloroform, carbontetrachloride, trichloroethylene, perchloroethylene, methyl acetate, ethyl acetate, butyl acetate, acetone, methylethylketone and methylisobutylketone.

5. The adhesive defined in claim 1 wherein said halogenated elastomer is present in an amount ranging between 30 and 90 parts by weight, said oxime component is present in an amount between 2.0 and 28.0 parts by weight, said hexavalent chromium component is present in an amount ranging between 0.32 and 12.0, and said inorganic acid is present in an amount between 0.08 and 3.0 parts by weight per 100 parts by weight of the dry adhesive.

References Cited

UNITED STATES PATENTS 2,453,471  11/1948  Switzer _____ 260—33.6 A
2,581,920   1/1952  Kuhn _____ 260—33.6 A (Other references on following page)

References Cited

| | | | |
|---|---|---|---|
| 3,096,301 | 7/1963 | Jankowski | 260—33.6 A |
| 3,220,968 | 11/1965 | Dollhausen | 260—31.8 D R |
| 3,562,202 | 2/1971 | Smith et al. | 260—41 R |
| 2,430,589 | 11/1947 | Sloan | 260—738 X |

OTHER REFERENCES

Carroll C. Davis, The Chemistry and Technology of Rubber, p. 754, Rheinhold Pub. Corp. New York. TS1890D25.

Irving Skeist, Handbook of Adhesives. Reinhold Pub. Corp. New York. TP 968S5C.4.

ALLAN LIEBERMAN, Primary Examiner

P. R. MICHL, Assitant Examiner

U.S. Cl. X.R.

156—333; 161—217; 260—32.8 A, 33.6 A, 33.8 UA